Jan. 1, 1963  C. D. MACY ET AL  3,071,065
MACHINE FOR BROWNING AND FORMING SOLID MEAT
Original Filed Aug. 15, 1958  2 Sheets-Sheet 1

INVENTORS
CHRISTIAN D. MACY
FRANK M. BROWN
BY JULIUS A. ZILLGITT

Williamson, Schroeder, & Palmatier
ATTORNEYS

INVENTORS
CHRISTIAN D. MACY
FRANK M. BROWN
JULIUS A. ZILLGITT
BY
*Williamson, Schroeder & Palmatier*
ATTORNEYS

United States Patent Office 3,071,065
Patented Jan. 1, 1963

3,071,065
MACHINE FOR BROWNING AND FORMING
SOLID MEAT
Christian D. Macy, Frank M. Brown, and Julius A. Zillgitt, Austin, Minn., assignors to Geo. A. Hormel & Co., Austin, Minn., a corporation of Delaware
Original application Aug. 15, 1958, Ser. No. 755,186. Divided and this application Jan. 18, 1960, Ser. No. 3,170
6 Claims. (Cl. 99—353)

This invention, which is a divisional application of our co-pending application, Serial No. 755,186, filed August 15, 1958, relates to a machine for simultaneously searing or browning and compactly forming chunks of meat for subsequent human consumption.

Such meats as lamb, pork roast, veal and other pieces butchered for sale in large chunks at the present time are often commercially packaged in metal cans or other containers and are at least partially pre-cooked in the metal containers after filling of the containers with the meat in raw state.

With such procedure, browing or searing of the exterior surface of the meat chunk is impossible with the result that many of the delicious flavors are lost in the can. Meats of the class described are substantially improved in taste and texture if when fresh, the external surfaces are seared, glazed or browned as by cooking upon a spit or searing by broiling or pan frying. The caramelized exteriors when so treated, not only adds to the over-all taste but seals in inherent juices and flavors and produces a more tender texture of the interior content.

It is an object of our present invention to provide a machine which will simultaneously compact, form and sear-glaze the exterior surfaces or peripheries of boned or unboned chunks or portions of substantially solid meat, preparing and molding the same for commercial line canning and for subsequent pre-cooking of the canned chunks.

A further object is the provision of a machine of the class described which at low cost, may commercially function efficiently in a modern packing house to perform its operations in a line feeding to commercial meat canning machines and wherein the operation time element is brief but nevertheless highly efficient.

These and other objects and advantages of our invention will more fully appear from the following description made in connection with the accompanying drawings wherein like reference characters refer to similar parts throughout the several views and in which.

Figure 1:
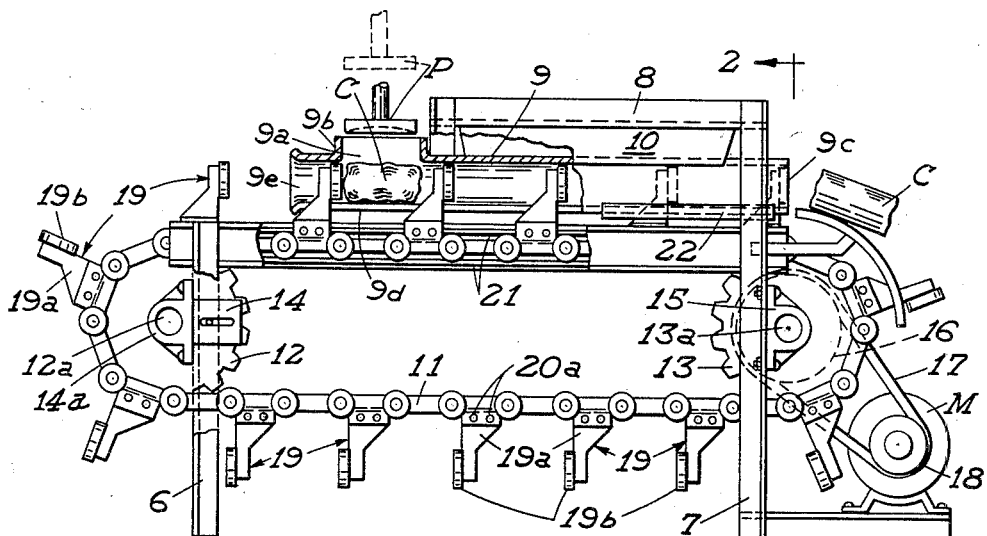
FIG. 1 is a view mostly in side elevation with some portions broken away in vertical section illustrating a continuous or endless type of machine for carrying out our improved method.
Figure 2:
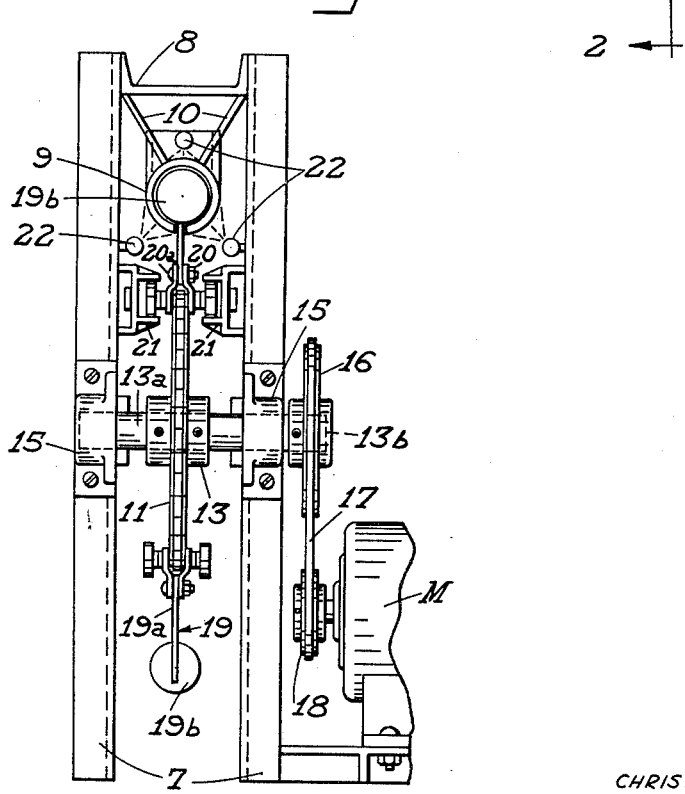
FIG. 2 is a vertical section taken on the line 2—2 of FIG. 1.

Referring to the form of the invention illustrated in FIGS. 1 and 2, the essential working parts of our machine are mounted in a suitable upright frame as shown comprising forward and rear pairs of parallel, rigidly mounted angle bars 6 and 7, respectively, suitably cross braced at upper and lower ends (not fully shown) by short cross beams, one of which, numbered 8, is shown in FIG. 2.

An open ended searing and forming tube 9 is rigidly supported near the top of the machine frame, preferably being declined forwardly slightly from the horizontal to cause liquids and drippings to drain therefrom and having adjacent the forward end thereof an oblong shaped laterally extending entrance 9a defined by an upstanding rectangular flange 9b for receiving the boned or unboned chunks of solid meat. In some instances, it is desirable to provide with the machine, an instantaneously operated compressor plate P mounted for vertical reciprocating movement just above the entrance opening 9a and having a concave, cylindrical lower surface for momentarily compressing the chunks of meat within the entrance in substantially cylindrical form. The searing and forming tube as shown is rigidly supported from depending, downwardly converging metal webs 10 which may be welded or otherwise secured at their upper ends to the short cross beams 8 and similarly secured at their lower converging ends to the top portion of the tube 9.

The rear or delivery end 9c of the tube may directly communicate with a conventional canning machine or if desired, the molded and formed chunks of meat efficiently glazed and seared, may be continuously delivered to a conveyor or other receiving mechanism (not shown).

We provide simple mechanism cooperating with the forming and searing tube 9 for successively and substantially continuously forcing and moving the meat chunks C through tube 9. To this end as shown in FIGS. 1 and 2, an endless roller chain 11 is trained about forward and rear sprockets 12 and 13 respectively, sprocket 12 as shown being affixed to a journalled shaft 12a mounted in suitable bearings 14a which have an adjustable slot and clamping nut bracket 14 connected with the rear portions thereof and mounted upon the forward uprights 6 of the frame to adjustably tension chain 11 when such is needed. The rear chain sprocket 13 is affixed to a shaft 13a which is suitably journaled in bearings 15 affixed appropriately to the rear upright frame member 7. The shaft 13a as shown in FIG. 2 has an extension 13b which has affixed thereto a chain sprocket 16 over which a chain 17 is trained, with driving connection to a smaller sprocket 18, affixed to the output shaft of an electric geared head motor M.

At appropriate spaced intervals longitudinally of the endless roller chain 11 pusher elements or pistons 19 are affixed, having as shown, narrow outwardly projecting shank portions 19a which may be constructed of thick sheet material such as stainless steel, which are suitably attached as by bolts and brackets 20a and 20 respectively, to the links and roller shafts of the chain sections. These shanks 19a are accommodated in a longitudinal narrow slot 9c formed in the lower portion of the tube 9 and extending the full length of said tube. To precisely guide the shanks and the disc pushers or plungers 19b carried thereby we prefer to provide roller tracks 21 of channel construction mounted a short distance below the tube 9 and supported as shown, from the spaced pairs of upright channels 6 and 7 of the supporting frame. The pusher or piston disc 19b loosely and internally fits the interior of tube 9 and for facilitating entrance of the pistons into the tube, the forward end of the tube may be flared outwardly as shown at 9e in FIG. 1.

The tube 9 constructed of heat-conductive metal such as stainless steel or cast iron, aluminum or other suitable metals is externally heated to a relatively high temperature throughout most of the length thereof by suitable means such as two or three elongated burners 22, each having a series of longitudinally spaced jets or orifices directed against the external periphery of tube 9. It is desirable to heat the tube 9 to a mean internal temperature between 200 and 1000 degrees F., depending upon the length of the tube and the speed travel of the plunger pushers 19b therethrough, lower temperatures of course being utilized where the cycle of the searing operation is slower.

In the operation of our invention, chunks of meat in raw state are successively fed by automatic or hand means into the entrance and receiving portion 9a of the tube. The feeding operation is, of course, synchronized with the travel of the endless chain 11 to the end that preferably a chunk of meat is fed between successive cooperating pairs of the moving plungers 9b. Straight line movement of the meat during forming and glazed searing thereof is desired and the meat must be kept in motion to prevent adherence to the internal wall of the tube which is preferably smooth and polished.

The meat chunks preferably fed with the smaller ends thereof directed towards the delivery end of tube 9 are compressed, formed and in most instances slightly elongated through their travel in the confining tube 9. Tube 9, if desired, may taper slightly from the receiving end thereof to the delivery end. As the successive chunks of meat are pushed forwardly by action of the plunger pushers 19b, their exteriors are seared and nicely browned to form a very thin glazing thereon, the application of the intense heat serving substantially to effect the desired shaping of the delivered articles. Delivery may be made directly to cans of appropriate cross section abutted against the delivery ends 9c of the tube or the articles may be deposited upon a suitable cross or other conveyor for subsequent handling. A very uniform browning and searing of the external surfaces or peripheries of the meat is assured and the delivered chunks are of very uniform shape with most of the natural juices and flavors remaining therein.

The interior of the meat is not cooked during the short searing operation but may be pre-cooked subsequently after canning of the formed product.

Figure 3:
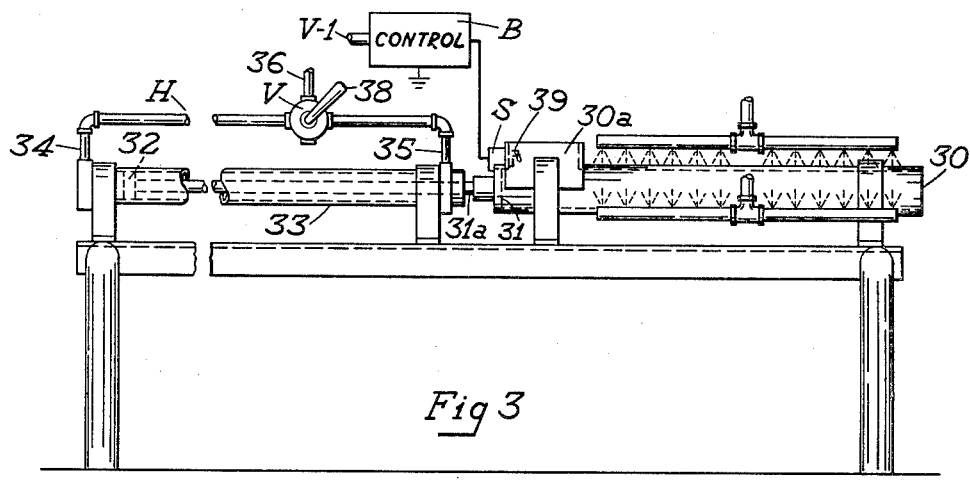
FIG. 3 is a side elevation showing another form of our machine for successive cycle operation with electrical control mechanism being diagrammatically illustrated.
Figure 4:
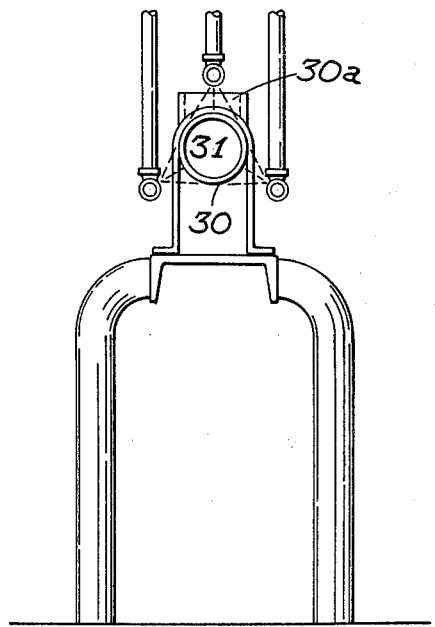
FIG. 4 is a rear elevation of the machine of FIG. 3.

FIGS. 3 and 4 show another form of our machine where the chunks of meat are successively forced through a searing and forming tube 30 by action of a controlled reciprocating piston 31 affixed to the outer end of a piston rod 31a controlled by a pressure fluid mechanism (pneumatic or hydraulic) indicated as an entirety by the letter H. To this end, the piston rod 31a intermediately carries an operating piston 32 which is slidably mounted within a fluid cylinder 33, conduit connections 34 and 35 being made with the interior of the fluid cylinder 33 at the respective ends thereof. A four-way rotary valve indicated as an entirety by the letter V selectively controls flow of fluid under pressure from a source conduit 36 to the two fluid entrance conduits 34 and 35. When one of said entrance conduits 35 is connected with the source conduit 36, the opposite entrance conduit is connected with the return conduit 37 communicating with the fluid line or fluid storage tank.

The valve mechanism V may be manually controlled by handle 38 or if automatic operation synchronized with automatic feeding of the chunks of meat is desired, a suitable mechanism can be employed such as electric micro switch S having a spring-actuated finger 39 which is depressed by feeding of the successive chunks of meat into the receiving end 30a of tube 30. The micro switch electrically produces an impulse on the electric control box B which employs mechanism for momentarily energizing a reversible motor, not shown, which drives through gear reduction, the valve shaft V-1 to first interconnect the pressure fluid with the rear of cylinder 33 for actuation of the piston rod 31a forwardly and then through a lag or time period synchronized with the travel of the piston 31 throughout tube 30 to reverse the motor to connect the pressure fluid with the forward connection 35 to the cylinder, retaining the valve in the return position for a sufficient time to return the pusher piston 31 to the normal retracted position. Thereafter the cycle will be completed upon the entrance of the next chunk of meat C into the tube and operation of the spring finger 39.

From the foregoing description it will be seen that we have provided a novel machine which will simultaneously compact, form and sear-glaze the exterior surfaces or peripheries of boned or unboned chunks or portions of substantially solid meat, preparing and molding the same for commercialized canning and for subsequent pre-cooking of the canned chunks. It will further be seen that we have provided a machine structure of simple, economical form and particularly adaptable to be commercially employed in packing houses or the like for high capacity operations.

Where herein in the appended claims, the term "chunks" is employed referring to meat, the same is in a broad sense to include any quartered or butchered, solid pieces of meat having substantial volume as well as a mass or ground meat or the like inserted into the machine in substantially solid form.

It is to be understood that while our invention is particularly applicable to the browning, searing and forming of chunks of meat, it is not to be restricted to exclude similar treatment of other chunk-type food products which may or may not contain meat ingredients.

It will, of course, be understood that various changes may be made in the form, details, arrangement and proportions of the parts without departing from the scope of our invention which consists of the matter shown and described herein and set forth in the appended claims.

What is claimed is:

1. A machine for molding and externally searing chunks of food such as meat, having in combination a stationary, heat-conductive, elongated tube having a smooth internal surface and an open discharge end, the forward end of said tube having an entrance communicating therewith into which chunks of meat may be successively fed, means for compressing the cross sectional dimensions of said chunks throughout the lengths thereof as they are so fed to obtain substantial peripheral contact of said chunks with said tube, means for substantially uniformly heating said tube and maintaining the temperature thereof at a searing point and driven plunger means slidably positioned within said tube for forward longitudinal sliding travel therein, said plunger means being shaped and contoured to engage the rear portion only of a chunk of food having a cross sectional area substantially equal to the cross sectional area of the tube to force the chunks of food forwardly through said tube in peripheral contact against the smooth internal surface thereof and to successively discharge the molded and seared chunks from the forward end thereof.

2. The structure set forth in claim 1 and said tube being inclined slightly from the horizontal to cause the drippings to be discharged from the lower end thereof.

3. The structure set forth in claim 1 and said driven plunger means comprising an endless carrier element having a run thereof positioned in close parallel relation to said tube, a plurality of spaced plunger elements projecting laterally and outwardly from said endless carrier element and having plunger heads loosely fitting the interior of said tube and having narrow shank portions connecting said heads with said endless carrier and said tube having a narrow longitudinal slot therein accommodating said shank portions and means for driving said endless carrier element.

4. The structure set forth in claim 3 and mechanism synchronized with the rate of travel of said endless carrier element to successively feed said chunks into the rear end of said tube between the successive plunger heads.

5. A machine for molding and externally searing chunks of food such as meat, having in combination a stationary, heat-conductive, elongated tube having a smooth internal surface and an open discharge end, the forward portion of said tube having an entrance communicating laterally therewith into which chunks of meat may be successively fed, means for compressing the cross sectional dimensions of said chunks throughout the lengths thereof as they are so fed to obtain substantial peripheral contact of said chunks with said tube, means for substantially uniformly heating said tube and maintaining the internal temperature thereof at a searing point, a piston slidably mounted in said tube and projectible from a position in the rear end of said tube to a position in the discharge end thereof, said piston being shaped and contoured to engage a rear portion only of a chunk of meat having a cross sectional area substantially equal to the cross sectional tube to force the chunks of food forwardly through said tube in peripheral contact against the smooth internal surface thereof, and power means for reciprocating said piston in said tube.

6. The structure set forth in claim 5, mechanism for successively feeding chunks at predetermined intervals through said entrance into said tube and control mechanism synchronized with the speed of reciprocation of said piston within said tube for actuating said power, piston reciprocating means.

References Cited in the file of this patent

UNITED STATES PATENTS

| | | |
|---|---|---|
| 1,214,627 | Wild | Feb. 6, 1917 |
| 1,490,162 | Dow | Apr. 15, 1924 |
| 1,975,916 | Bech | Oct. 9, 1934 |
| 2,375,351 | Di Carlo | May 8, 1945 |
| 2,415,592 | Hoenecke | Feb. 11, 1947 |
| 2,793,582 | Rothe et al. | May 28, 1957 |
| 2,820,709 | Schack et al. | Jan. 21, 1958 |
| 2,935,930 | Abrams | May 10, 1960 |